(12) United States Patent
Burnham et al.

(10) Patent No.: US 7,990,266 B2
(45) Date of Patent: *Aug. 2, 2011

(54) LOCATION- AND DIRECTION-ENHANCED AUTOMATIC REMINDERS OF APPOINTMENTS

(75) Inventors: Robert Burnham, Idaho Springs, CO (US); Cliff Howard, Dacono, CO (US); Susan Love, Broomfield, CO (US); Paul Madsen, Englewood, CO (US); John Rishea, Denver, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/878,583

(22) Filed: Sep. 9, 2010

(65) Prior Publication Data

US 2011/0010220 A1    Jan. 13, 2011

Related U.S. Application Data

(62) Division of application No. 11/327,773, filed on Jan. 6, 2006, now Pat. No. 7,847,686.

(51) Int. Cl.
*G08B 1/08* (2006.01)

(52) U.S. Cl. .......... 340/539.13; 340/539.26; 340/988; 340/994; 340/995.1; 701/117; 701/202; 701/206; 701/207; 701/213

(58) Field of Classification Search .......... 340/539.13, 340/539.26, 988, 994, 995; 701/117, 202, 701/206, 207, 213; 705/9, 209
See application file for complete search history.

(56) References Cited

U.S. PATENT DOCUMENTS

| | | | |
|---|---|---|---|
| 2003/0046304 A1* | 3/2003 | Peskin et al. | 707/104.1 |
| 2006/0218029 A1* | 9/2006 | Chin | 705/8 |

* cited by examiner

Primary Examiner — Tai T Nguyen

(57) ABSTRACT

An automatic appointment reminder system uses location and/or direction of travel of the reminder recipient relative to appointments to affect the time of sending of appointment reminders to the user, and thus enhances the user's ability to be on-time for appointments.

11 Claims, 3 Drawing Sheets

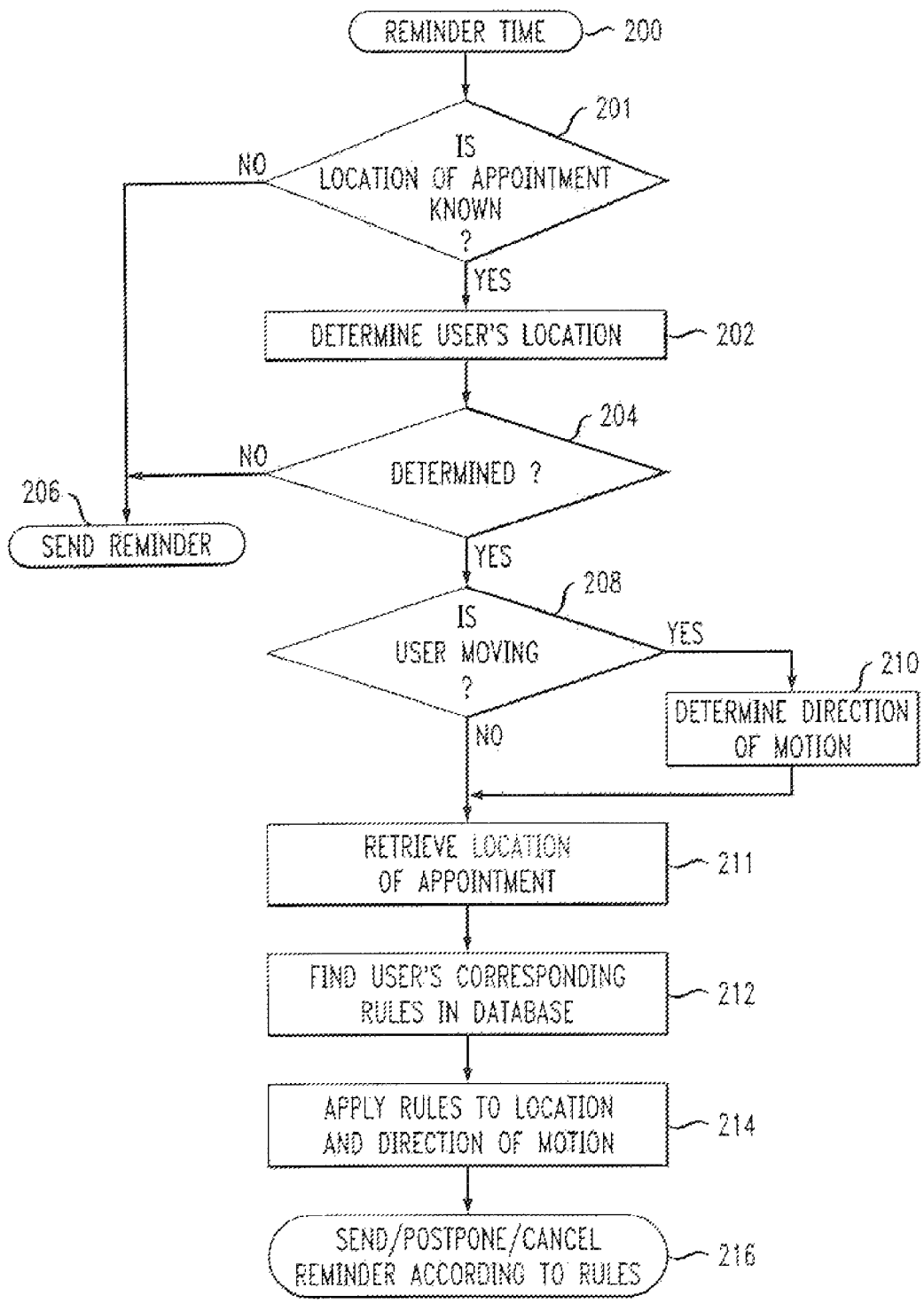

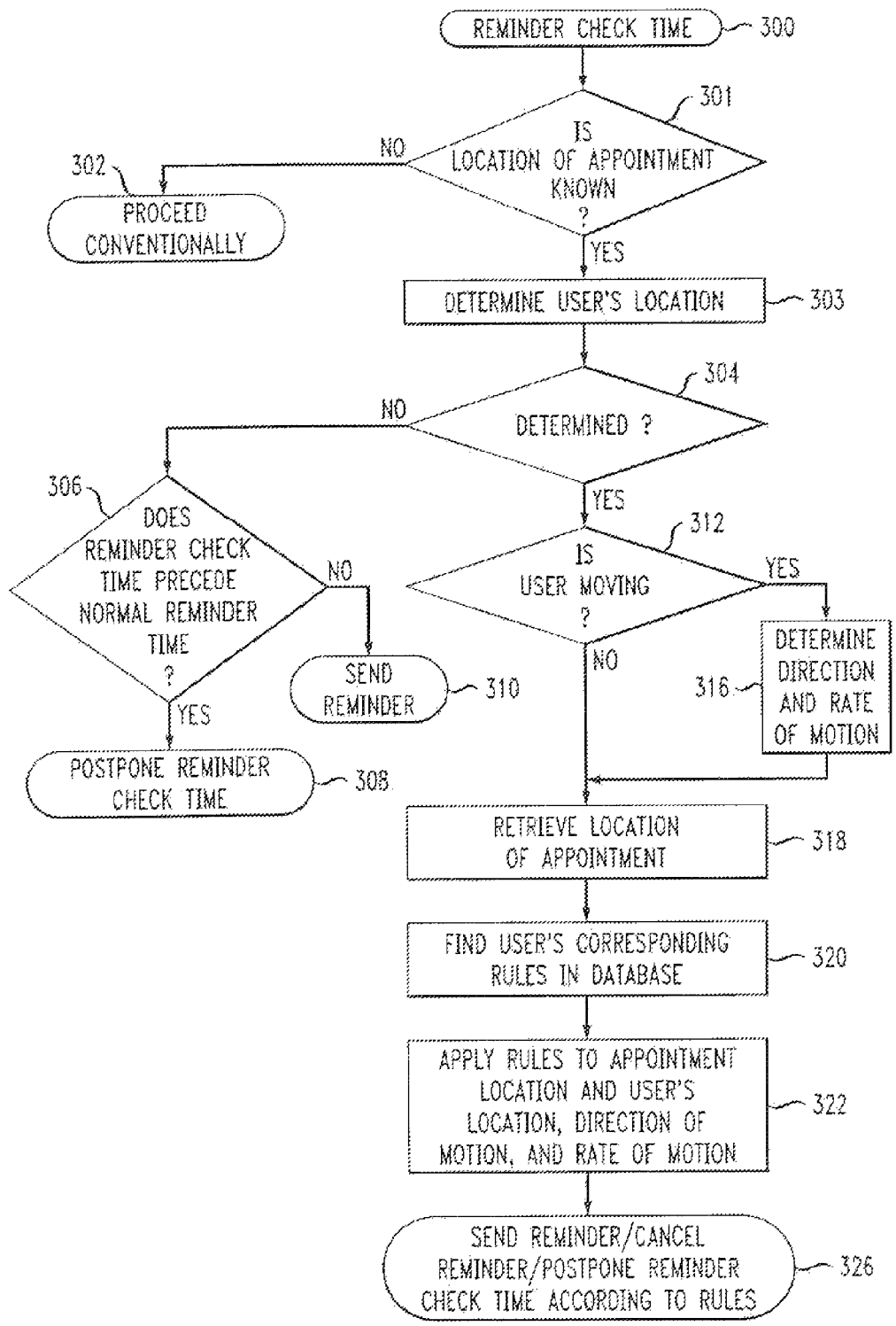

LOCATION- AND DIRECTION-ENHANCED AUTOMATIC REMINDERS OF APPOINTMENTS

CROSS-REFERENCE TO RELATED APPLICATIONS

This application is a divisional of U.S. patent application Ser. No. 11/327,773, filed on Jan. 6, 2006, now U.S. Pat. No. 7,847,686, and claims the benefit thereof.

TECHNICAL FIELD

This invention relates to the field of automated reminder arrangements.

BACKGROUND OF THE INVENTION

Calendar-based automatic reminding applications are well known in the art. They integrate a calendaring application, such as Microsoft Outlook Calendar, with a messaging application, such as Microsoft Exchange, to send electronic messages to a user informing him or her of a calendar entry (referred to herein as an appointment) at some selected period of time before the time of the appointment. An example thereof is MobiSMS from MobiMarketing, which synchronizes with Outlook Calendar to send short Message Service (SMS) calendar-entry reminders to communication devices of specified persons. The known applications send the reminders irrespective of other factors that may influence whether or not sending of the reminder is appropriate, such as the user's present activity, location, or direction of travel.

Location-based services, which assist people in their decision-making during performance of tasks in space and time, are also known. They support spatial queries, such as "the shortest route from here to there" and "nearest restaurant from here," where "here" is the location of the user, specified either by the user or by any location-detecting system (e.g., Global Positioning Satellites, triangulation, etc.). Examples thereof are described in U.S. Pat. Nos. 5,963,861 and 6,177,905, and in M. Raubal and C. Rinner, "Multi-Criteria Decision Analysis for Location Based Services," *Proc. 12$^{th}$ Int. Conf. on Geoinformatics* (Geoinformatics 2004) (Gavle, Sweden, 7-9 Jun. 2004), pp. 47-53. Another example is car or palmtop navigation tools that deliver a constant stream of instructions to the user based on the user's current location to help the user follow a route and arrive at a desired destination. Examples thereof are the CoPilot product of ALK Technologies Inc., the Destinator product of Homeland Security Technology Corporation, and a cell phone equipped with the Nokia Xpress-on GPS shell from Nokia Corporation.

SUMMARY OF THE INVENTION

We have recognized that advantages are to be gained by integrating the principles of calendar-reminder applications with location-based services to condition sending of calendar reminders on location and/or direction of travel of the reminder recipient relative to the appointment. For example, if the intended recipient of an e-mail reminder is not at their desk at the time of sending of the reminder, the reminder may be useless and it would be preferable to send a page or a voice reminder instead. Or, if the intended recipient is occupied in certain activities (e.g., in the washroom, or in an executive conference room) at the time of sending of the reminder, it may be inappropriate to interrupt the recipient and preferable to delay the reminder. Or, if the intended recipient is already on the way to or at the location that is the subject of the reminder, a reminder may not be needed. Or, if the intended recipient is far away from the place of the appointment, a reminder sent at a predetermined, standard time interval before the appointment may be too late to be of any use.

According to an embodiment of the invention, therefore, there is provided a machine-implemented method of reminding a person of appointments, which involves determining a location and a time of an appointment, determining a location of the person, and using the determined locations and the determined time to schedule a reminder of the appointment. The reminder is then sent to the person at the scheduled time. The invention thus improves the ability of a person who uses an automatic appointment reminder system to be on-time for the appointments.

While the invention has been characterized in terms of method, it also encompasses apparatus that performs the method. The apparatus preferably includes an effector—any entity that effects the corresponding step, unlike a means—for each step. The invention further encompasses any computer-readable medium containing instructions which, when executed in a computer, cause the computer to perform the method steps.

BRIEF DESCRIPTION OF THE DRAWING

These and other features and advantages of the invention will become more apparent from a description of an illustrative embodiment of the invention when considered together with the drawing, in which:

FIG. 2 is a functional flow diagram of operations of a reminder server of the system of FIG. 1 according to one embodiment of the invention; and FIG. 3 is a functional flow diagram of operations of the reminder server of the system of FIG. 1 according to another embodiment of the invention.

DETAILED DESCRIPTION

Figure 1:
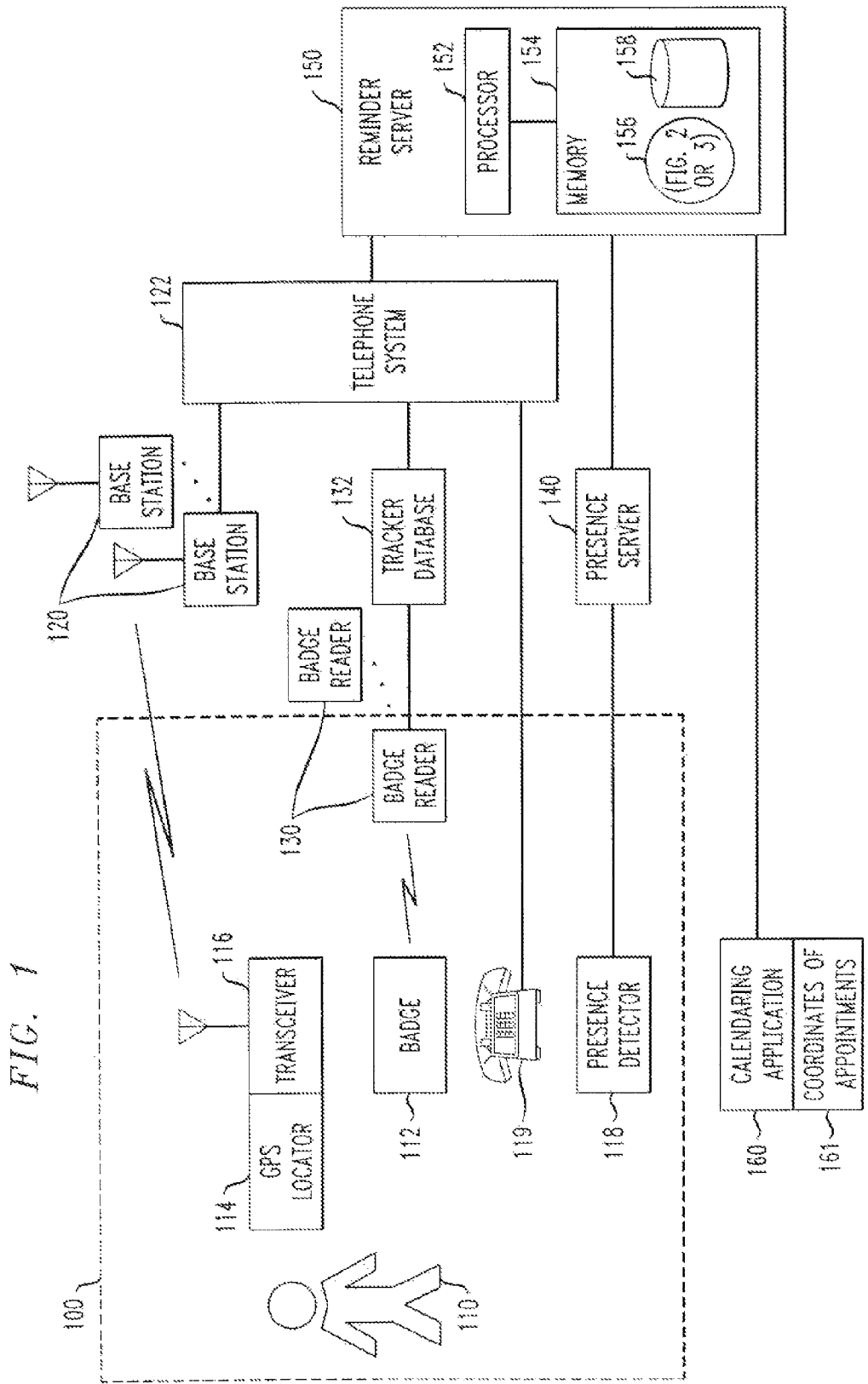
FIG. 1 is a block diagram of an appointment-reminder system that includes illustrative embodiments of the invention.

FIG. 1 shows a system that includes an illustrative embodiment of the invention. The system includes the present physical location 100 of a user 110. That location may be, for example, the user's car or some other transportation vehicle, a building, a conference room, or the user's office. Location 100 includes various means 112-119 for remotely determining the user's location, such as the user's office desktop telephone 119, a presence detector 118, such as an instant-messaging application running on the user's office desktop computer, a wireless transceiver 116 integrated with a global positioning system (GPS) locator 114, such as a GPS-equipped portable wireless phone, a car phone, or a personal digital assistant (PDA), or an RFID-equipped badge 112 of a user plus a badge reader 130 located in the user's office, conference room, building hallway, etc. These are just some examples of possible means for determining the user's location; the list is not exhaustive, and any other desired means for determining the user's location may be used as well.

Desk telephone 119 is connected to a telephone system 122, which can determine whether phone 119 is in use or idle. Wireless telephone or PDA 114-116 is connected via a base station 120 to telephone system 122, which can interrogate GPS 114 through transceiver 116. Badge reader 130 is connected to a tracking database 132 that stores readings reported by badge reader 130 and which can in turn be interrogated through telephone system 122 for the name of the person's location (e.g., "Conference Room B," or "Hallway A at aisle F," or "Point X"). And presence detector 118 is connected to a presence server 140 to which it reports presence information on user 110.

A reminder server 150 is connected to a calendaring application 160 of user 110, such as the user's Outlook Calendar. Reminder server 150 is a stored-program controlled apparatus comprising a memory 154 for storing data and programs needed for operation of server 150, and a processor 152 that uses the data and executes the programs from memory 154. Server 150 illustratively includes a Microsoft Exchange server, and also includes the functionality of conventional, calendar-based, automatic reminding applications. According to the invention, however, server 150 further includes a database 158 of rules and a program 156 that uses those rules to condition the conventional reminder functionality by the location of user 110. Server 150 may serve reminders to one user 110 only, but in most applications server 150 serves a plurality of users and consequently has access to a plurality of users' calendaring applications 160. Database 158 may store a set of rules that apply to all users served by server 150, or each user may have his or her own set of rules in database 158. In order to make information on the locations of users 110 available to server 150, server 150 is connected to presence server 140 and to telephone system 122.

Rules defining any desirable behavior of reminder server 150 may be used to populate database 158. The rules may be formulated in any desired form—for example, they may take the form of "if, then" statements, or they may be given an order of precedence. Illustrative rules include:

If user 110 is already at the appointment's location, then do not send a reminder.
If user 110 is already on the conference bridge of the appointment, then do not send a reminder.
If user 110 has left the appointment's location, and either has been gone for a period of time greater than x, or the appointment will commence within a period of time less than x, then send a reminder.
If user 110 is located in a "do not disturb zone" (administratively defined), then do not send a reminder.
If user 110 has left the "do not disturb zone" and the appointment has not yet taken place, then send a reminder.
If user 110 is heading toward the appointment's location, do not send a reminder.
If user 110 is heading away from the appointment's location, then send a reminder.
If user 110 is not at the appointment's location and is stationary, then send a reminder.

In order to be able to employ these rules, server 150 must know or be able to determine the locations (physical or virtual, such as a conference bridge) of appointments. For this purpose, calendaring application 160 includes not only the conventional appointment times and descriptions, but also includes for each appointment a location 161 for the appointment, such as its geographical coordinates. Alternatively, location 161 of appointments may be derived by server 150 by matching keywords of appointment descriptions (such as "headquarters building," or "meeting room B," or "my office," or the address of the appointment, for example) against a database whose entries correlate the keywords with coordinates.

The aspects of one embodiment of operations of server 150 that are unconventional are shown in FIG. 2. Server 150 monitors calendaring application 160 for appointments, in a conventional manner, and determines how far ahead of each appointment to send a reminder, also in a conventional manner. Server 150 also keeps track of postponed (rescheduled) reminders. When it determines that it is time to send an appointment reminder, at step 200, server 150 first checks whether the location coordinates of the appointment are available, at step 201. If not, server 150 proceeds conventionally and sends the reminder to user 110 whose calendar entry this appointment represents, at step 206. If so, server 150 tries to determine the location of user 110, at step 202. Server 150 does this by querying presence server 140, telephone system 122, tracker database 132, and the user's portable wireless communications device 114-116. If it finds, at step 204, that it cannot determine the user's location, server 150 proceeds to send the reminder to user 110 in the conventional manner, at step 206. If it finds at step 204 that it was able to determine the user's location at step 202, server 206 determines if user 110 is moving, at step 208. For example, if it determines that user 110 is presently using their desktop telephone 119 or computer 118, it assumes that user 110 is not moving. If it determines that user 110 is using their car phone, it assumes that user 110 is moving. If it determines the user's presence from a badge reader 130 or the user's portable wireless device 114-116, it assumes that user 110 may be moving. If user 110 is or may be moving, reminder server 150 tries to determine the direction of the user's motion, at step 210. For example, it does so by querying again portable wireless communications device 114-116 and tracker database 132 for a change in the user's location. If it determines that user 110 is not moving at step 208, or after determining the direction of the user's motion at step 210, server 150 retrieves from calendar application 116 or from a database the coordinates of the appointment, at step 211. Server 150 also retrieves from database 158 the reminder rules that are applicable to the user 110, at step 212, and applies these rules to the user's determined location and direction of motion, at step 214, to determine what to do with the scheduled reminder that triggered this process at step 200. Server 150 then either sends the reminder conventionally, postpones it until a later time, or cancels it, at step 216, as dictated by the rules.

Unlike in the embodiment of FIG. 2, server 150 in the embodiment of FIG. 3 starts processing appointments some period of time before the normal (a user-specified or a system-specified) time for sending a reminder. For example, if the normal reminder time is 15 minutes before the appointment, server 150 will start processing the appointment x hours before the appointment time. This earlier time is referred to herein as a "reminder check time." At reminder check time of an appointment in calendaring application 160 of a user 110, determined at step 300 of FIG. 3, server 150 first checks whether the location coordinates of the appointment are available, at step 301. If not, server 150 proceeds conventionally, at step 302, and will send the appointment reminder at the normal reminder time. If so, server 150 tries to determine the location of user 110, at step 303, in the manner described for step 202 of FIG. 2. If it finds, at step 304, that it cannot determine the user's location, server 150 checks if the reminder check time is earlier then the normal reminder time, at step 306. If the reminder check time precedes the normal reminder time, server 150 reschedules the reminder check time for a later time—15 minutes later, for example—at step 308. If it finds at step 306 that the reminder time does not precede the normal reminder time, server 150 sends the reminder to user 110, in the conventional manner, at step 310.

If server 150 finds at step 304 that it was able to determine the user's location, server 150 determines if user 110 is moving, at step 312, in the manner described for step 208 of FIG. 2, and also tries to determine the user's direction of motion, at step 314, in the manner described for step 210 of FIG. 2. Or, the direction-of-motion information may come from server 150 itself. Also at step 314, server 150 determines the rate of motion of user 110, for example, by determining the time interval between queries of the user's location and the change in the coordinates of the user's location between those queries. If it determines that user 110 is not moving at step 312, or after determining the user's direction and/or rate of motion at step 316, server 150 retrieves from calendaring application 116 or from a database the coordinates of the appointment, at step 318. Server 150 also retrieves from database 158 the reminder rules that are applicable to this user 110, at step 320, and applies these rules to the appointment coordinates and the user's location and direction and rate of motion, at step 322, to determine what action to take. Server 150 then either sends the reminder at this time, or cancels the reminder, or postpones the reminder check time, at step 326, as dictated by the rules.

The reminder rules that are used include those described for the embodiment of FIG. 2, but additionally may include rules such as If the calculated reminder time occurs before the reminder check time, either cancel the reminder for user 110 or send a "can't make meeting on time" message.

If the calculated reminder time falls after the reminder check time and before the appointment time, schedule the reminder for user 110 and update the reminder based on periodic checks of tracker database 132.

If the calculated reminder time falls after the appointment time, either cancel the reminder for user 110 or send a "can't make meeting on time" message.

If user 110 is determined to be outside of a predetermined location range y, then do not engage the reminder time check mechanism (example: user 110 is in Los Angeles, but the face-to-face appointment location is Can berra).

If the time for a second meeting away from the office of user 110 is "close" to the time for a first away meeting (i.e., user 110 is unlikely to return to the office in between the meetings) remind user 110 of both meetings at the earliest calculated reminder time of the two meetings.

Of course, various changes and modifications to the illustrative embodiment described above will be apparent to those skilled in the art. For example, the reminder server, and even the calendaring application and coordinates of appointments, may be implemented on the user's portable communications device. Or, real-time traffic and road construction information can be brought in as additional inputs to the time-to-travel algorithm. This would likely provide more accurate meeting reminders. One can also tap into existing GPS routing services to allow the user to access best-route information to their scheduled meeting. Furthermore, users may be given the option of sharing their location and time-to-travel information with other meeting participants. That way if a person were running late for a meeting, the other people attending the meeting could access that person's information in the Outlook calendar and see that person's arrival progress. If it looked like the person were only a couple of minutes away, the meeting could be delayed until they arrived. However, if that person were still some distance away and were going to be significantly late, the other participants could either start the meeting without that person or reschedule for another time when all participants would be available. Also, the idea of time-to-travel-based reminders can be extended into other areas, such as a public transportation application to notify a person when they have to be at the bus stop or train station in order to arrive at a desired destination on time. The application would access public transportation timetables and replace a scheduled appointment location with the location of the public transportation station that the person must be at in order to make the flight, train, bus, etc. Also, the application can postpone the start time of a meeting based on the location of other attendees (and their consequent expected arrival times) and postpone the appointment reminders accordingly. These changes and modifications can be made without departing from the spirit and the scope of the invention and without diminishing its attendant advantages. It is therefore intended that such changes and modifications be covered by the following claims except insofar as limited by the prior art.

What is claimed is:

1. A machine-implemented method of reminding a person of appointments, comprising:
determining a location and a time of an appointment;
determining a location and a direction of motion of the person by performing at least one of the following steps:
obtaining presence information of the person from a source of the presence information and obtaining a name of said location of the person from a source of the name; and
using the determined locations, direction of motion, and time, to schedule a time for a reminder of the appointment.

2. The method of claim 1 wherein:
using the determined locations and time comprises
applying a database of rules to the determined locations and the determined time to schedule the reminder of the appointment.

3. The method of claim 1 wherein:
using the determined locations, direction of motion, and time comprises
applying a database of rules to the determined locations, the determined time, and the determined direction of motion to schedule the reminder of the appointment.

4. The method of claim 1 further comprising:
determining a current direction of motion of the person at the scheduled time;
in response to the current direction being a predetermined direction, forbearing from sending the scheduled reminder to the person at the scheduled time; and
in response to at least the current direction not being the predetermined direction, sending the scheduled reminder of the appointment to the person at the scheduled time.

5. The method of claim 1 further comprising:
determining a rate of the motion of the person;
wherein
using the determined locations, direction of motion, and time comprises
using the determined locations, direction of motion, rate of motion, and time to schedule the time for the reminder of the appointment.

6. An apparatus for reminding a person of appointments, comprising:
means for determining a location and a time of an appointment;
means for determining a location of the person comprising at least one of means for obtaining presence information of the person from a source of the presence information and means for obtaining a name of said location of the person from a source of the name; and
means for using the determined locations and the determined time to schedule a time for a reminder of the appointment.

7. The apparatus of claim 6 wherein:
the means for determining a location and a time of an appointment comprise
means for reading entries of a calendaring application.

8. The apparatus of claim 7 wherein:
the means for determining a location and a time of an appointment comprise
means for reading a source of geographic coordinates of the entries; and
the means for determining a location of the person comprise
means for querying a GPS locator of a mobile wireless communications device of the person.

9. The apparatus of claim 6 further comprising:
means for causing the scheduled reminder of the appointment to be sent to the person at the scheduled time.

10. An apparatus for reminding a person of appointments, comprising:
- a query mechanism that obtains a location and a time of an appointment from a source that specifies the location and the time of the appointment;
- a query mechanism that determines the location of the person by obtaining information from at least one source including presence information of the person from a source of the presence information and a name of said location of the person from a source of the name;
- a rules engine that applies a database of rules to the obtained locations and the obtained time to determine a time for sending the reminder of the appointment; and
- a scheduler that sends the reminder at the determined time for sending.

11. In an apparatus for reminding a person of appointments, including a query mechanism that obtains a location and a time of an appointment from a source that specifies the location and the time of the appointment, a query mechanism that obtains a location and a direction of motion of the person from at least one source of location of the person, a rules engine that applies a database of rules to the obtained locations, direction of motion, and time to determine a time for sending the reminder of the appointment, and a scheduler that sends the reminder at the determined time for sending, wherein the apparatus comprises:
- the query mechanism adapted to determine the location of the person by obtaining information from at least one source including presence information of the person from a source of the presence information and a name of said location of the person from a source of the name;
- the query mechanism for obtaining a location and a direction of motion of the person is further adapted to determine a rate of the motion of the person; and
- the rules engine is further adapted to apply the database of rules to the obtained locations, direction of motion, rate of motion, and time to determine the time for sending the reminder of the appointment.

* * * * *